United States Patent
Chen et al.

(10) Patent No.: US 6,387,008 B1
(45) Date of Patent: May 14, 2002

(54) SPEED-CHANGING CONTROL MECHANISM OF MULTISTAGE SPEED-CHANGING WHEEL HUB

(75) Inventors: Jia-Lin Chen; Ching-Huan Tseng; Caesar Chen, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/396,495

(22) Filed: Sep. 13, 1999

(51) Int. Cl.$^7$ ................................................. F16H 3/44
(52) U.S. Cl. ...................... 475/296; 192/43.2; 475/297; 475/298; 475/289
(58) Field of Search ................................. 475/296, 297, 475/298; 192/41 R, 43.2, 217.4

(56) References Cited

U.S. PATENT DOCUMENTS

| | | | |
|---|---|---|---|
| 5,273,500 A | * 12/1993 | Nagano | 475/312 |
| 5,855,530 A | * 1/1999 | Huang et al. | 475/289 |
| 5,863,270 A | * 1/1999 | Chen et al. | 475/289 |
| 5,964,679 A | * 10/1999 | Matsuo et al. | 475/297 |
| 6,039,671 A | * 3/2000 | Keller | 475/296 |
| 6,045,475 A | * 4/2000 | Yoo | 475/12 |

* cited by examiner

*Primary Examiner*—Sherry Estremsky
*Assistant Examiner*—Tisha D. Lewis
(74) *Attorney, Agent, or Firm*—W. Wayne Liauh (57) ABSTRACT

A speed-changing control mechanism of a multistage speed-changing wheel hub has a planetary gear device comprising a gear support and a plurality of planetary gears. The planetary gears are respectively engaged with a ring gear and sun gears. The rotational power of a drive member is transmitted to the ring gear or the gear support via a sleeve. A speed ratio change is brought about by the action of the planetary gears and the sun gears. The power is finally transmitted to the wheel hub via the gear support or the ring gear. The planetary gears are driven by the power input source portion of the sleeve in conjunction with the action of another sleeve on the fastening shaft, thereby controlling two sets of one-way ratchet pawls opposite in direction to engage or disengage. As a result, the input of the power source and degrees of freedom of the sun gears can be controlled by the use of the control slot, thereby preventing the interference between the retaining slot and the control key and eliminating the complicated power shifting mechanism.

12 Claims, 11 Drawing Sheets

| Ratchet pawl / Speed ratio | 420 | 320 | 511 | 521 | 531 | 330 | 430 |
|---|---|---|---|---|---|---|---|
| First speed ratio | + | × | × | × | + | + | − |
| Second speed ratio | + | × | × | + | × | + | − |
| Third speed ratio | + | × | + | × | × | + | − |
| Fourth speed ratio | × | + | + | × | × | + | − |
| Fifth speed ratio | × | + | + | × | × | × | + |
| Sixth speed ratio | × | + | × | + | × | × | + |
| Seventh speed ratio | × | + | × | × | + | × | + |

Fig. 15

SPEED-CHANGING CONTROL MECHANISM OF MULTISTAGE SPEED-CHANGING WHEEL HUB

FIELD OF THE INVENTION

The present invention relates generally to a bicycle gear-shifting mechanism, and more particularly to a bicycle speed-changing mechanism making use of only one sleeve and a plurality of control slot sets to carry out a power source impartation. The mechanism also makes use of another sleeve and another control slot to control the one-way ratchet pawl so as to control the fastening of the sun gear set.

BACKGROUND OF THE INVENTION

The inner speed changing mechanism of the conventional bicycle has a planetary gear mechanism which is provided with the input member, which may be a ring gear or gear support. The ring gear or gear support is engaged with the toothed portion of a clutch for controlling the path of the power input of the planetary gear mechanism so as to control the degrees of freedom of the sun gear, thereby resulting in various speed ratios. In accordance with the characteristic of the planetary gear mechanism, the rotational direction of the sun gear is related to the driving power input member of the gear train. In other words, when the transmission is carried out by various power input members (gear support or ring gear), the rotational direction of the sun gear is changed. If the gear support is used as a driving power member, the sun gear is identical in the rotational direction to the gear support. If the ring gear is used as the driving power member, the rotational direction of the sun gear is opposite to the rotational direction of the ring gear. In order to resolve such a motion characteristic of the planetary gear train, the U.S. Pat. No. 5,399,128 discloses a sun gear which is provided in the inner edge thereof with a plurality of retaining slots. The sun gear is retained by a control key. However, the control key may fail to enter the retaining slot at the time when the speed ratio is changed. In keeping with such a principle, the disclosure makes use of the power input member to bring about the shifting process, which is by no mends free from troubles.

With the view of controlling the degrees of freedom of the sun gear, the U.S. Pat. No. 5,322,487 discloses two sets of two-step planetary gear for controlling the degrees of freedom of the sun gear in conjunction with two rotary sleeves and the projection on the fastening shaft. The expected speed ratio is thus attained. However, such an increase in number of the planetary gear and the sun gear results in a substantial increase in weight and complexity of the whole mechanism.

SUMMARY OF THE INVENTION

It is therefore the primary objective of the present invention to provide a speed-changing control mechanism of the multistage speed-changing wheel hub, which is capable of controlling smoothly the fastening mechanism of the sun gear.

It is another objective of the present invention to provide a speed-changing control mechanism of the multistage speed-changing wheel hub, which is capable of controlling smoothly the shifting of the power input member.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

As shown in all drawings provided herewith, a speed-changing control mechanism of a multistage speed-changing wheel hub of the present invention comprises a planetary gear device 4 comprising a gear support 40, a gear support connection body 401, and a plurality of planetary gears 41 of the gear support 40. The planetary gears 41 are engaged with a ring gear 3 and a sun gear set 50. The power is transmitted by a drive member 1 to the gear support connection body 401 or a ring gear connection body 31. The speed ratio change is brought about via the planetary gear device 4. The power is then transmitted to a wheel hub 2 by the ring gear 3 or the gear support 40. The power shifting process is smoothened by the motion of a second sleeve 7 and the use of the control slot of the second sleeve 7.

Furthermore, the engagement or the disengagement of the ratchet pawl set 501 with the engagement portion 81 of the fastening shaft 80 is made smooth by the movement of a first sleeve 6 and the use of the control slot 61 and the bevel 601 of the first sleeve 6. The degrees of freedom of the sun gear set 50 are thus controlled. In the meantime, the speed-changing mechanism of the present invention is simplified. The first sun gear 51, the second sun gear 52, and the third sun gear 53 of the sun gear set 50 are respectively provided with a first ratchet pawl set 511, a second ratchet pawl set 521, a third ratchet pawl set 531, which are formed of two sets of one-way ratchet pawls different in direction, for controlling the degrees of freedom of the sun gear set 50. The first ratchet pawl set 511, the second ratchet pawl set 521, and the third ratchet pawl set 531 are respectively provided with a first ratchet pawl set sloping side 512, a second ratchet pawl set sloping side 522, a third ratchet pawl set sloping side 532, which are intended to act on the sloping surface of the first sleeve 6.

Figure 1:
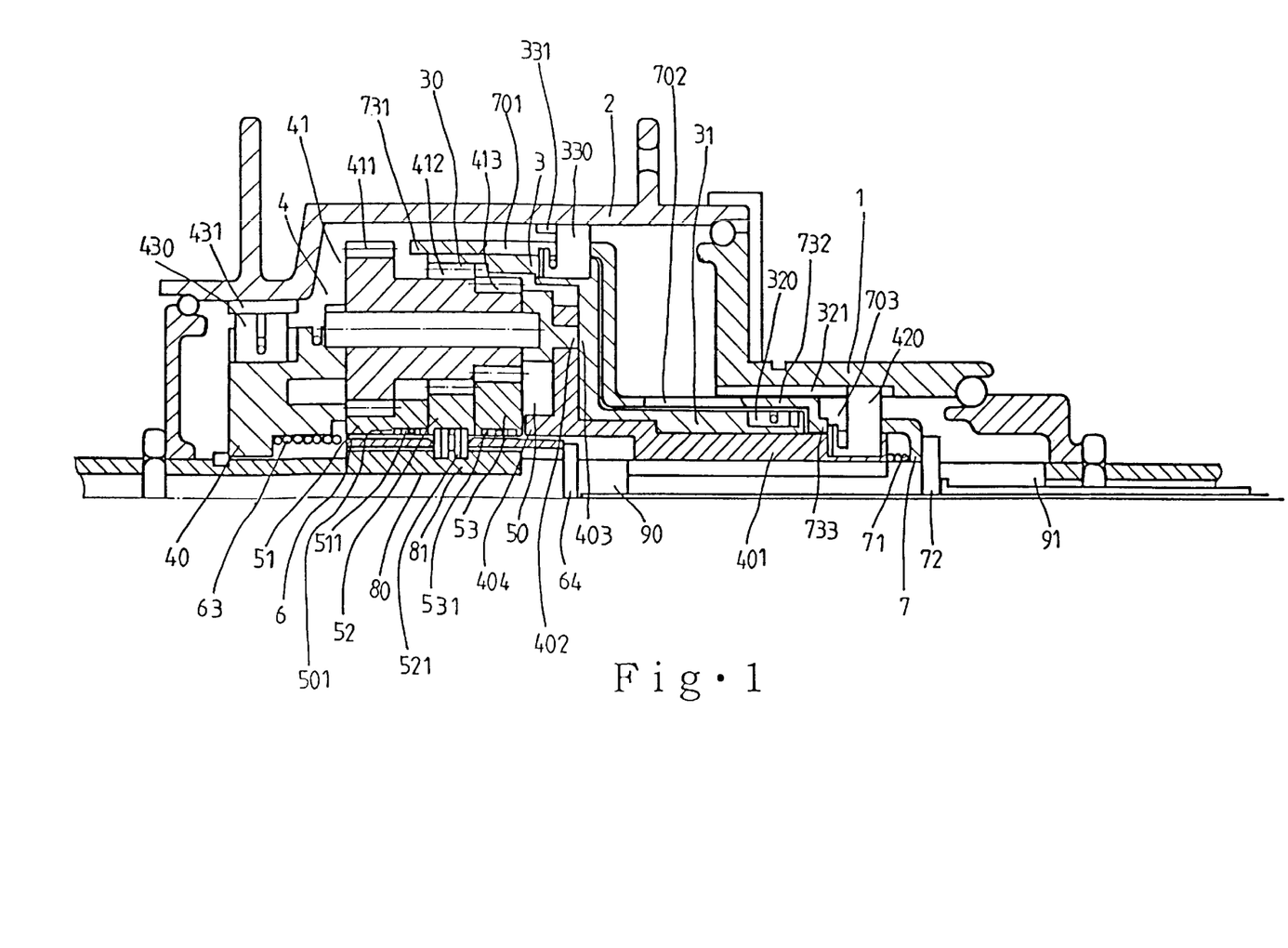
FIG. 1 shows a sectional view of the preferred embodiment of the present invention in combination.
Figure 2:
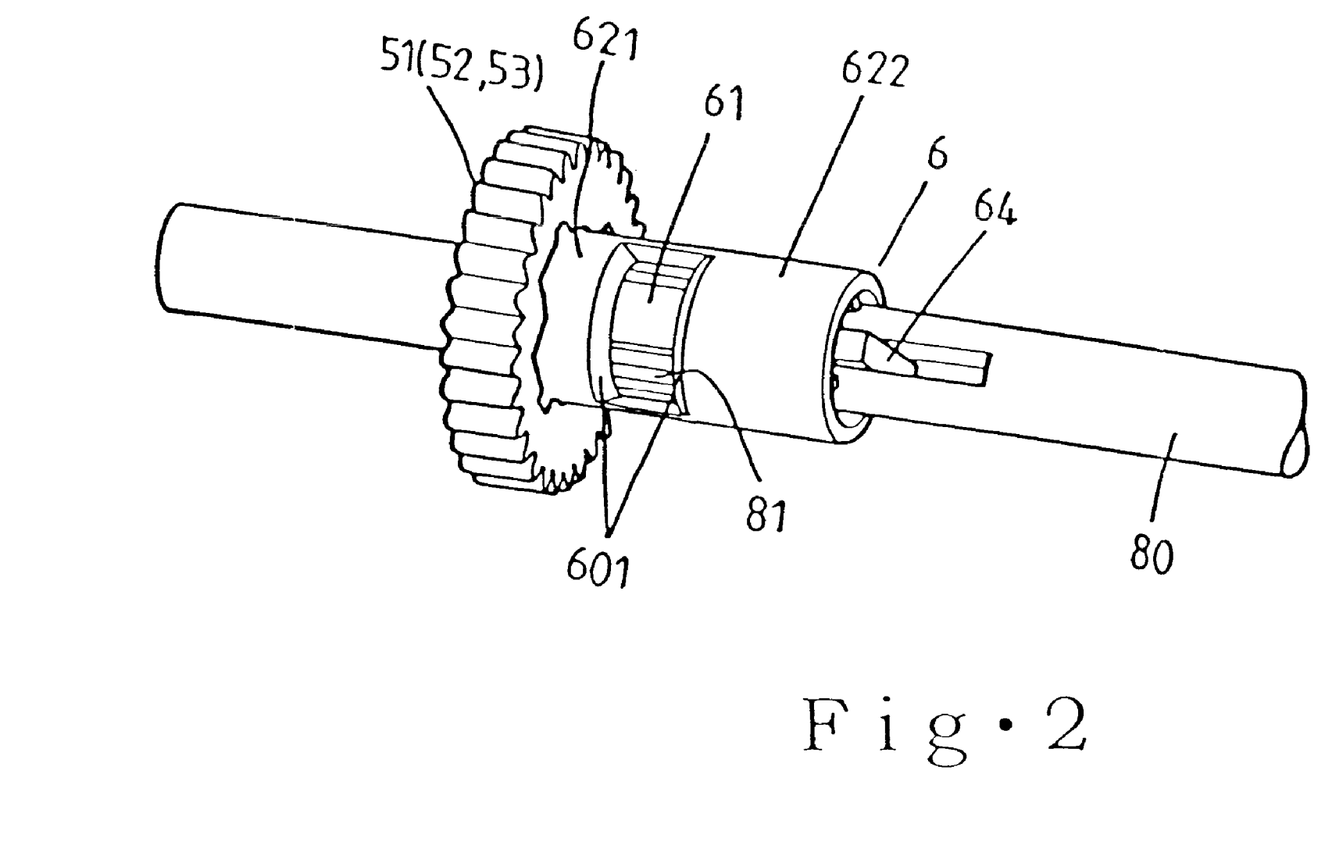
FIG. 2 shows a perspective view of the fastening shaft and the first sleeve device of the preferred embodiment of the present invention.

As shown in FIGS. 1 and 2, the fastening shaft 80 is fixed on a long rodlike body located at the center of the wheel hub 2. The fastening shaft 80 is provided on the midsegment thereof with an engagement portion 81, which is engaged with the ratchet pawl set 501 for controlling the degrees of freedom of the sun gear set 50. The engagement portion 81 is provided at one end thereof with a first longitudinal slot 90 for disposing a first control key 61 which is intended to control the movement of the first sleeve 6, so as to control the engagement or the disengagement of the ratchet pawl set 501 with the engagement portion 81. The engagement portion 81 is further provided at other end thereof with a second longitudinal slot 91 for disposing a second control key 73 which is used to control the movement of the second sleeve 7, so as to shift the power input member.

Figure 3:
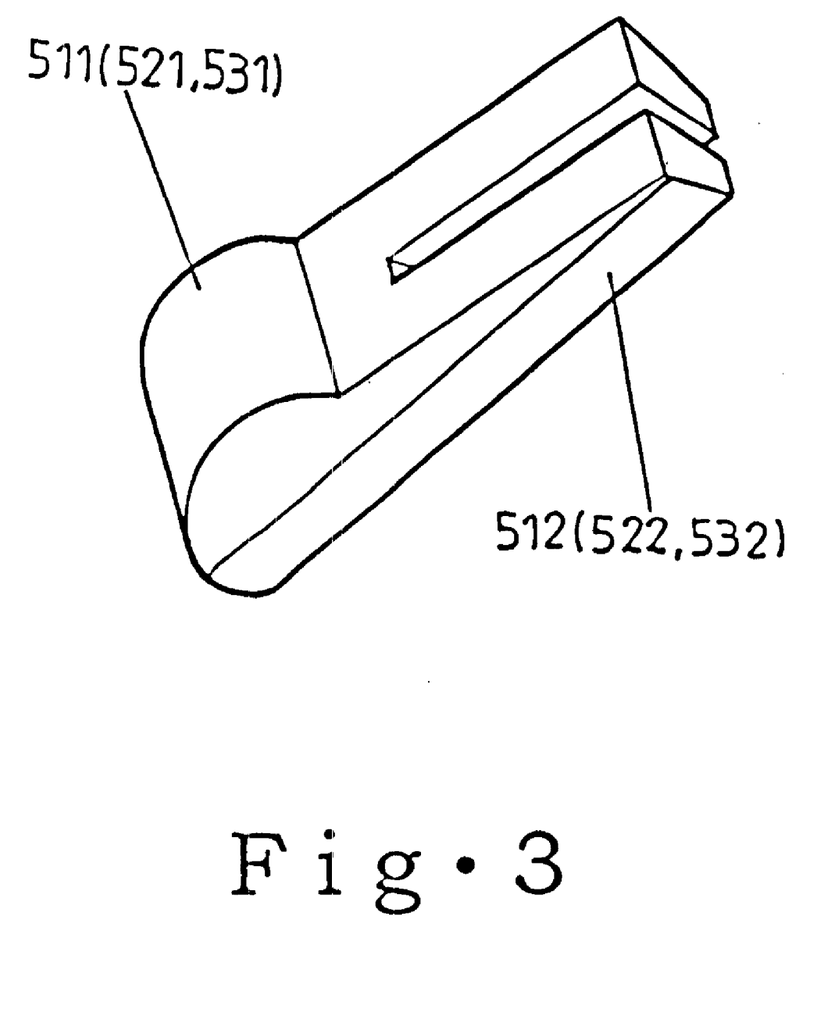
FIG. 3 shows a perspective view of the sun gear ratchet pawl set of the preferred embodiment of the present invention.

As shown in FIGS. 1–3, the first sleeve 6 has a tubular body of an appropriate length and is movably fitted over the fastening shaft 80. The first sleeve 6 is formed of a left covering surface 621, a right covering surface 622, a sloping surface 601, and a plurality of control slots 61. The control slots 61 are circularly arranged in the periphery of the first sleeve 6. When the first sleeve 6 is moved to the position of the second sun gear 52, the second ratchet pawl set 521 is engaged with the engagement portion 81 of the fastening shaft 80 via the control slot 61. In light of the covering action of the left covering surface 621 and the right covering surface 622, the first ratchet pawl set 521 and the third ratchet pawl set 531 are in the disengagement mode. If the first sleeve 6 is moved leftward such that the first sleeve 6 is located at the position of the first sun gear 51, the second ratchet pawl set 521 is in the disengagement state in view of the action of the sloping surface 601 and the second ratchet pawl set sloping side 522. In the meantime, the first ratchet pawl set 511 is engaged with the engagement portion 81 via the control slot 61. As a result, the control of degrees of freedom of the first sun gear 51 is attained. The second ratchet pawl set 521 and the third ratchet pawl set 531 are in the disengagement mode in view of the action of the right covering surface 622. If the first sleeve 6 is moved rightward to locate at the position of the third sun gear 53, the second ratchet pawl set 521 is in the disengagement state in view of the action of the sloping surface 601 and the second ratchet pawl set sloping side 522. In the meantime, the third ratchet pawl set 531 is engaged with the engagement portion 81 via the control slot 61. In light of the covering effect of the left covering surface 621, the first ratchet pawl set 511 and the second ratchet pawl set 521 are in the disengagement state. As a result, the control of degrees of freedom of the third sun gear 53 is attained. When the first sleeve 6 is in motion, the sloping surface 601 of the periphery of the control slot 61 depends on the first ratchet pawl set sloping side 512, the second ratchet pawl set sloping side 522, or the third ratchet pawl set sloping side 532 to push away the ratchet pawl which is engaged with the engagement portion 81. The disengaged ratchet pawl is thus capable of turning freely in relation to the sun gear.

Figure 4:
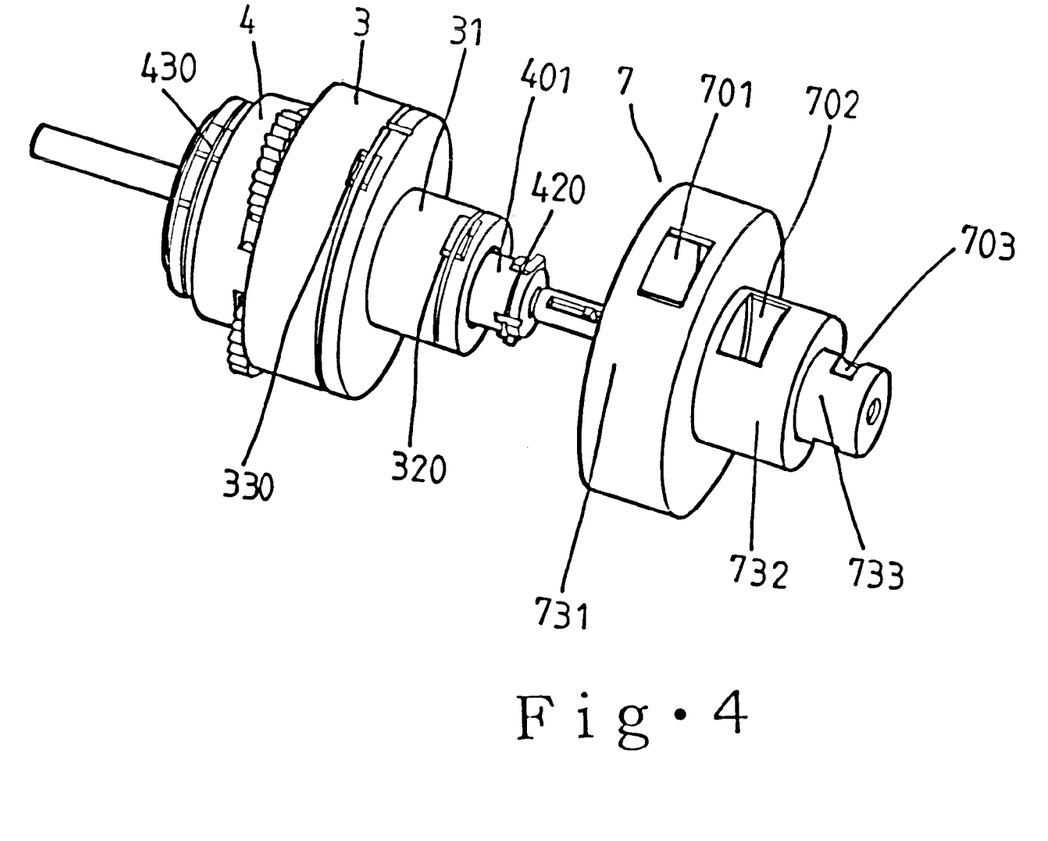
FIG. 4 shows a perspective view of the planetary gear device, the ring gear, and the second sleeve of the preferred embodiment of the present invention.

As shown in FIGS. 1 and 4, the planetary gear device 4 circumvents the sun gear set 50 and comprises the gear support 40, a plurality of planetary gears 41 mounted on the gear support 40, and the gear support connection body 401. The gear support 40 is of a bowl-shaped construction and is provided with a front end large hole and a rear end small hole. The front end large hole is greater than the outer periphery of the sun gear set 50. The rear end small hole is fitted over the read end of the fastening shaft such that the gear support 40 and the sun gear set 50 can rotate concentrically. The front end large hole is provided at the front end thereof with a plurality of protrusions 402 which are arranged circularly and engageable with the gear support connection body 401. The gear support 40 is provided at the rear end thereof with a first output ratchet pawl 430, which is engaged with the first output engagement portion 431 of the wheel hub 2, thereby enabling the power to be transmitted to the gear support at such time when the ring gear 3 is in motion. The motion is imparted to the wheel hub 2 by the first output ratchet pawl 430.

The gear support connection body 401 is of a columnar construction and has a front end and a rear end smaller in diameter than the front end. The front end is provided with a plurality of recesses 403 which are circularly arranged and are engageable with the protrusions 402 of the front end of the gear support. The rear end of the gear support connection body 401 is provided with a first input ratchet pawl 430 which is engageable with an input engagement portion 321 of the drive member 1 for imparting motion to the gear support 40 via the gear support connection body 401.

As shown in FIG. 1, the planetary gears 41 have a first stepped portion 411, a second stepped portion 412, and a third stepped portion 413, which are capable of revolving around the sun gears 51, 52 and 53. The second stepped portion 412 is engaged at one end thereof with the second sun gear 52, and at other end thereof with the engagement portion 30 of the ring gear 3. The first stepped portion 411 is engaged with the first sun gear 51 .The third stepped portion 413 is engaged with the third sun gear 53.

As shown in FIGS. 1 and 4, the ring gear 3 is of a bowl-shaped construction and is connected with a ring gear connection body 31 which is fitted over the second stepped portion 412 of the planetary gears 41 such that the ring gear connection body 31 is capable of turning concentrically along with the sun gear set 50. The ring gear 3 is provided at the front end thereof with an engagement portion 30 corresponding in location to the second stepped portion 412 of the planetary gears 42. The ring gear 3 is further provided on the front end thereof with a second output ratchet pawl 330 engageable with a second output engagement portion 331. When the gear support 40 is in motion, the motion is imparted to the ring gear 3. The motion is then imparted to the wheel hub 2 by the second output ratchet pawl 330.

The ring gear connection body 31 is of a columnar construction and is connected with the rear end of the ring gear 3. The ring gear connection body 31 is provided with a second input ratchet pawl 320 fastened therewith such that the second input ratchet pawl 320 is engageable with the input engagement portion 321 of the drive member 1, thereby resulting in the importation of motion to the ring gear 3 via the ring gear connection body 31.

Figure 5:
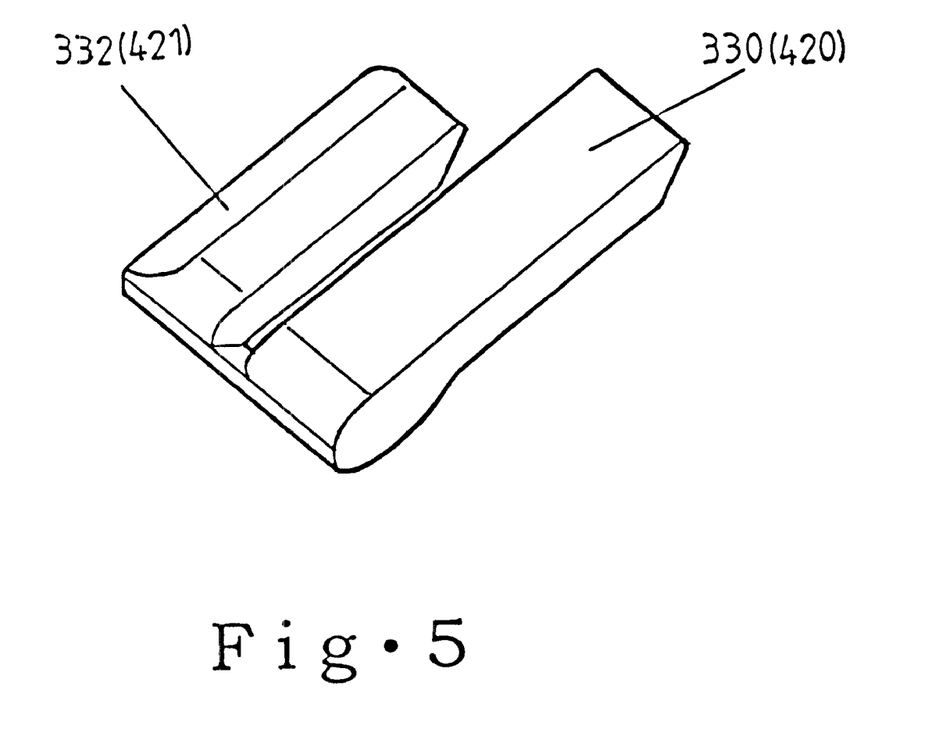
FIG. 5 shows a perspective view of a first input ratchet pawl and a second output ratchet pawl of the preferred embodiment of the present invention.
Figure 6:
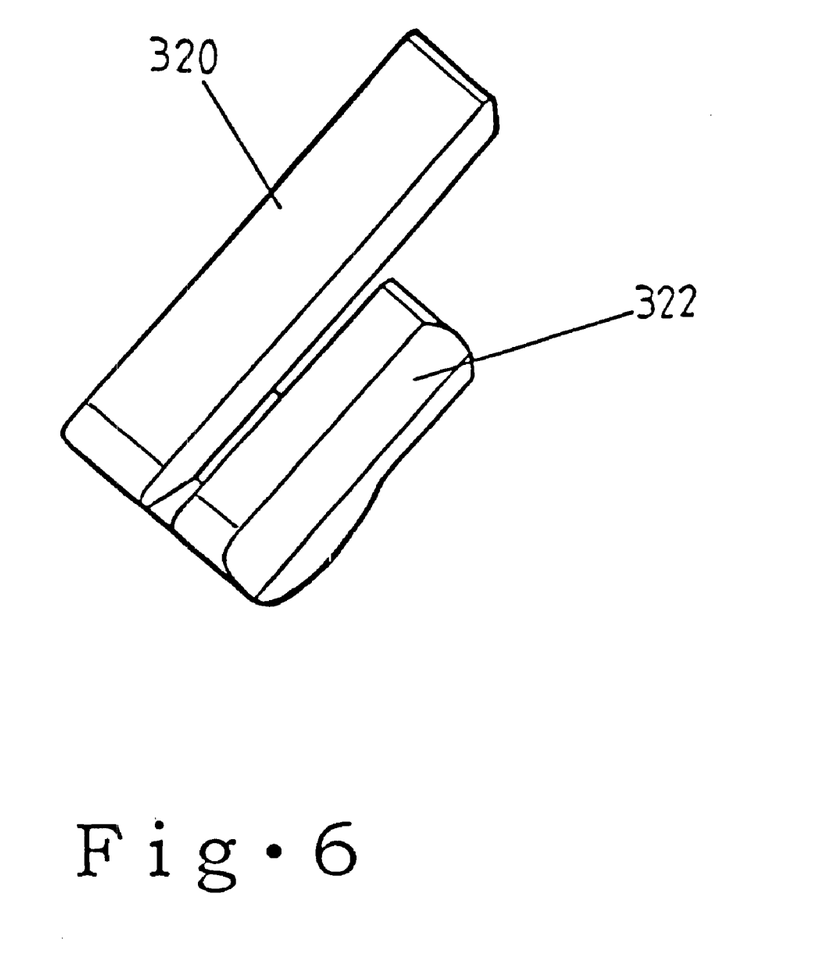
FIG. 6 shows a perspective view of a second input ratchet pawl of the preferred embodiment of the present invention.
Figure 7:
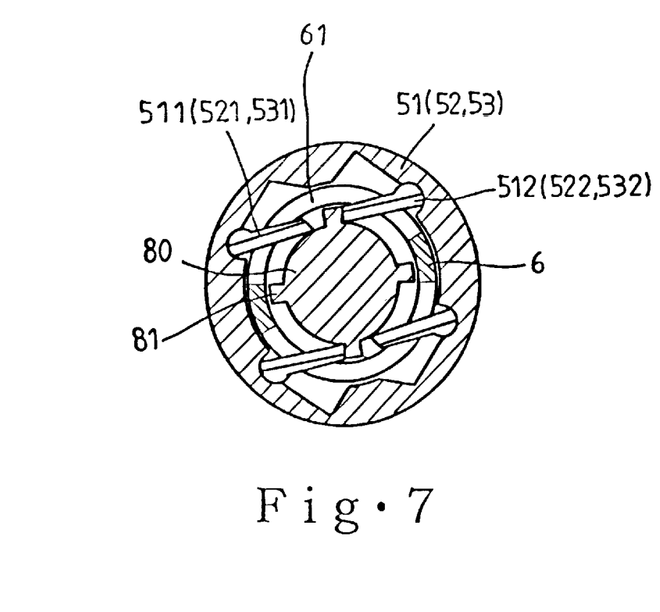
FIG. 7 shows a schematic view of the engagement of one of the ratchet pawls of the ratchet pawl set of the present invention at each speed ratio.
Figure 8:
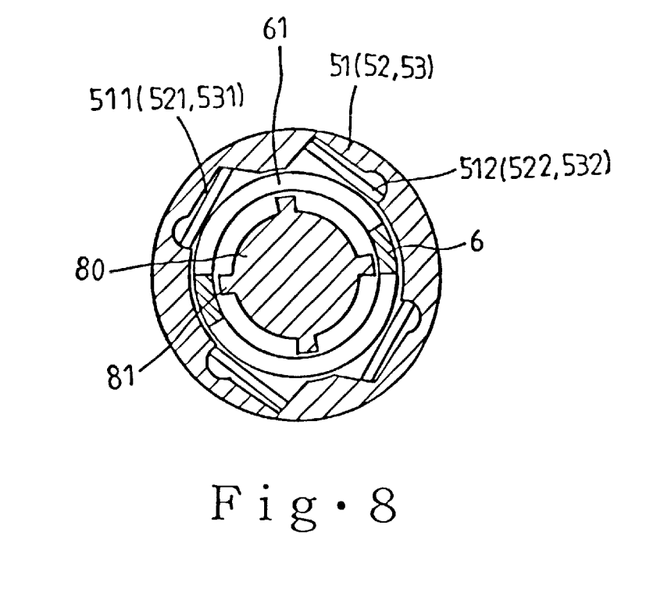
FIG. 8 shows a schematic view of the disengagement of one of the ratchet pawls of the ratchet pawl set of the present invention at each speed ratio.
Figure 9:
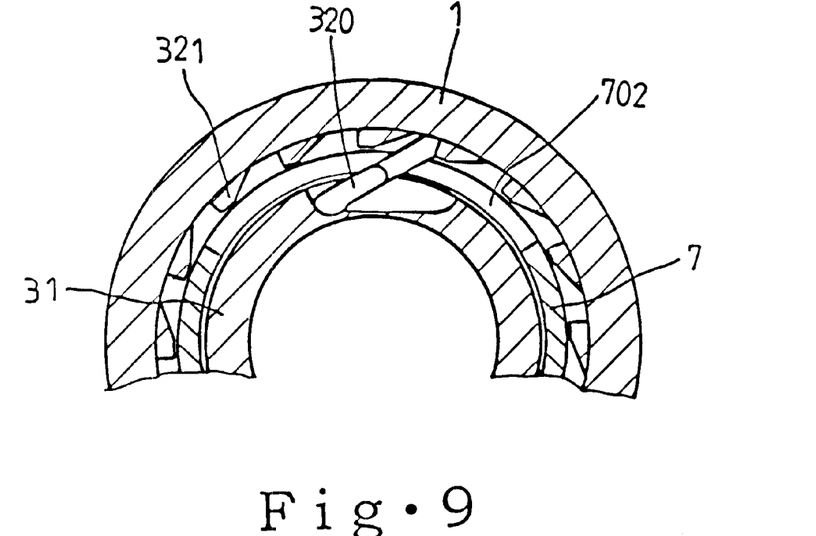
FIG. 9 shows a schematic view of the engagement of the first input ratchet pawl with the second output engagement portion of the present invention at the first, the second and the third speed ratios.
Figure 10:
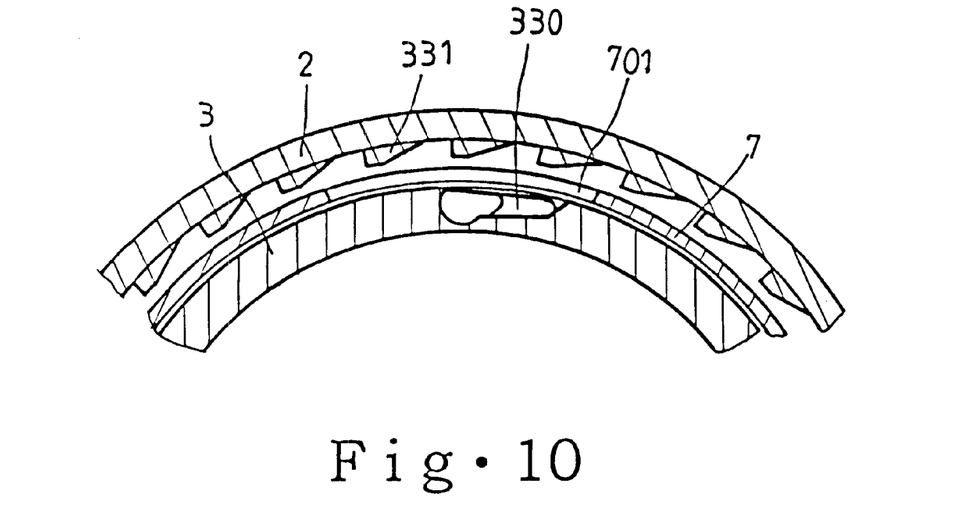
FIG. 10 shows a schematic view of the engagement of the second output ratchet pawl with the second output engagement portion of the present invention at the first, the second, and the third speed ratios.
Figure 11:
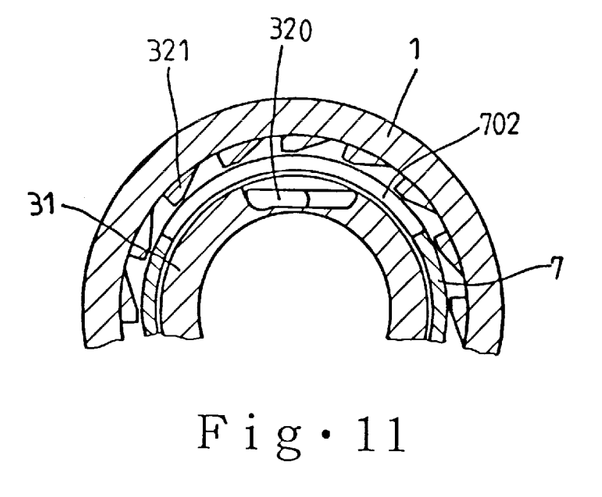
FIG. 11 shows a schematic view of the disengagement of the second input ratchet pawl of the present invention at the first, the second and the third speed ratios.

Now referring to FIGS. 5 and 6, the first input ratchet pawl 420, the second output ratchet pawl 330 and the second input ratchet pawl 320 are formed of a long portion and a short portion. The short portion is provided in one side thereof with a first input ratchet pawl sloping side 421, a second output ratchet pawl sloping side 332 and a second input ratchet pawl sloping side 322, The sloping sides 421, 332 and 322 are capable of acting on the control slot sloping side of the second sleeve, so as to enable the first input ratchet pawl 420, the second output ratchet pawl 330, or the second input ratchet pawl 320 to be in the disengaging state.

As shown in FIGS. 1 and 4, the second sleeve 7 is a stepped shell body and is movably fitted over the fastening shaft 80. The second sleeve 7 is provided at the front end thereof with a first set control slot 701, at the midsegment thereof with a second control slot 702, and at the rear end thereof with a third set control slot 703. The control slots 701, 702, and 703 are circularly arranged in the periphery of the second sleeve 7. Located respectively in the inner edge of the left side of the first set control slot 701, the inner edge of the right side of the second control slot 702 and the inner edge of the left side of the third set control slot 703 is a sloping side (not shown in the drawings). The first set control slot 701 is provided in the left side thereof with a first covering portion 731. The second set control slot 702 is provided in the left side thereof with a second covering portion 732. The third set control slot 703 is provided in the left side thereof with a third covering portion 733. When the second sleeve 7 is moved to its one ultimate end position, the first input ratchet pawl 420 is engaged with the input engagement portion 321 via the third set control slot 703. The second output ratchet pawl 330 and the second output engagement portion 331 are engaged. The power is transmitted from the drive member 1 to the gear support connection body 401 and the gear support 40 by the first input ratchet pawl 420. The power is subsequently transmitted from the ring gear 3 to the wheel hub 2 via the second output ratchet pawl 330. When the second sleeve is moved to the middle position, the first input ratchet pawl 420 is covered by the third covering portion 733 to remain in the disengaging state in view of the action of the left side inner edge sloping side of the third control slot and the first input ratchet pawl sloping side 421. The second input ratchet pawl 320 is engaged with the input engagement portion 321 via the second set control slot. The second output ratchet pawl 330 is engaged with the second output engagement portion 331. In the meantime, the power is transmitted from the drive member 1 to the ring gear connection body 31 and the ring gear 3 by the second input ratchet pawl 320. The power is then transmitted to the wheel hub 2 via the second output ratchet pawl 330. When the second sleeve is moved to another ultimate end position thereof, the first input ratchet pawl remains in the disengaging state, whereas the second input ratchet pawl 320 remains engaged with the input engaging portion 321. The second output ratchet pawl 330 is covered by the first covering portion 731 to remain in the disengaging state in view of the action of the left side inner edge of the first control slot 701 and the second output ratchet pawl sloping side 332. In the meantime, the power is transmitted from the drive member 1 to the ring gear connection body 31 and the ring gear 3 by the second input ratchet pawl 320. The power is then transmitted to the wheel hub 2 via the first output ratchet pawl 430.

Figure 13:
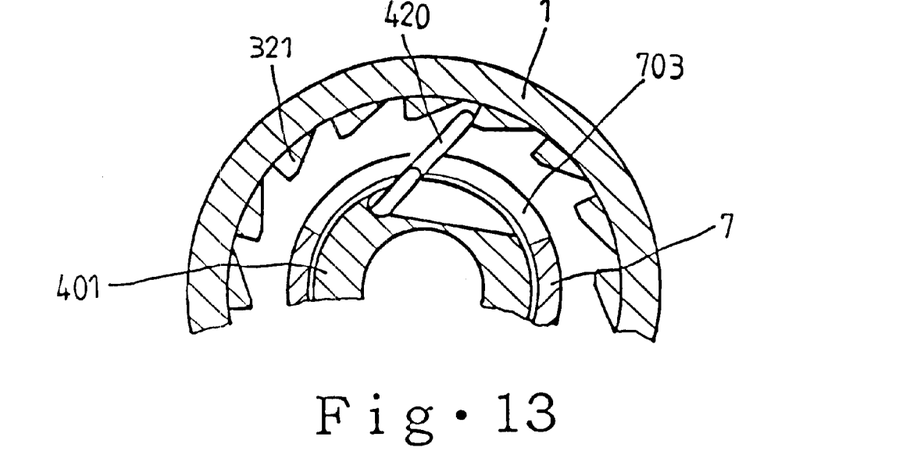
FIG. 13 shows a schematic view of the engagement of the second input ratchet pawl with the second input engagement portion of the present invention at the fourth, the fifth, the sixth, and the seventh speed ratios.
Figure 14:
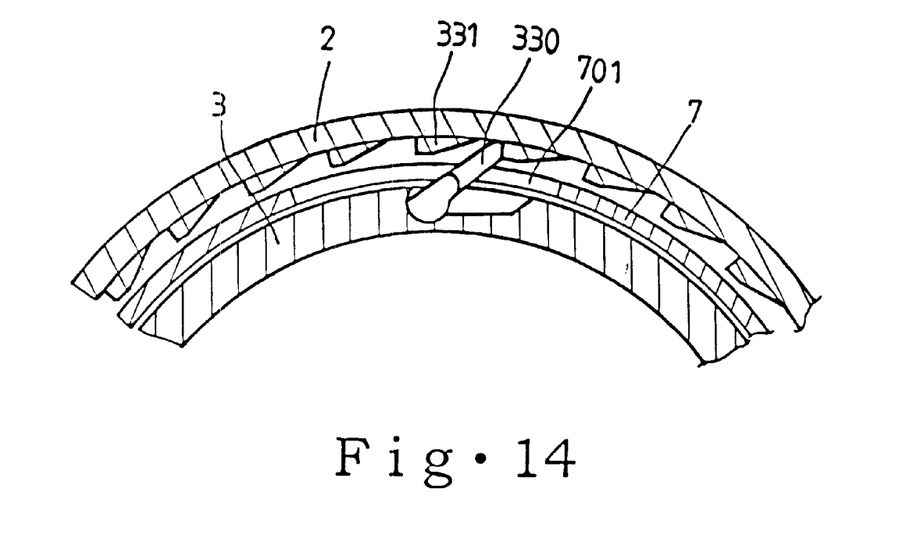
FIG. 14 shows a schematic view of the disengagement of the second output ratchet pawl of the present invention at the fourth, the fifth, the sixth, and the seventh speed ratios.
Figure 15:
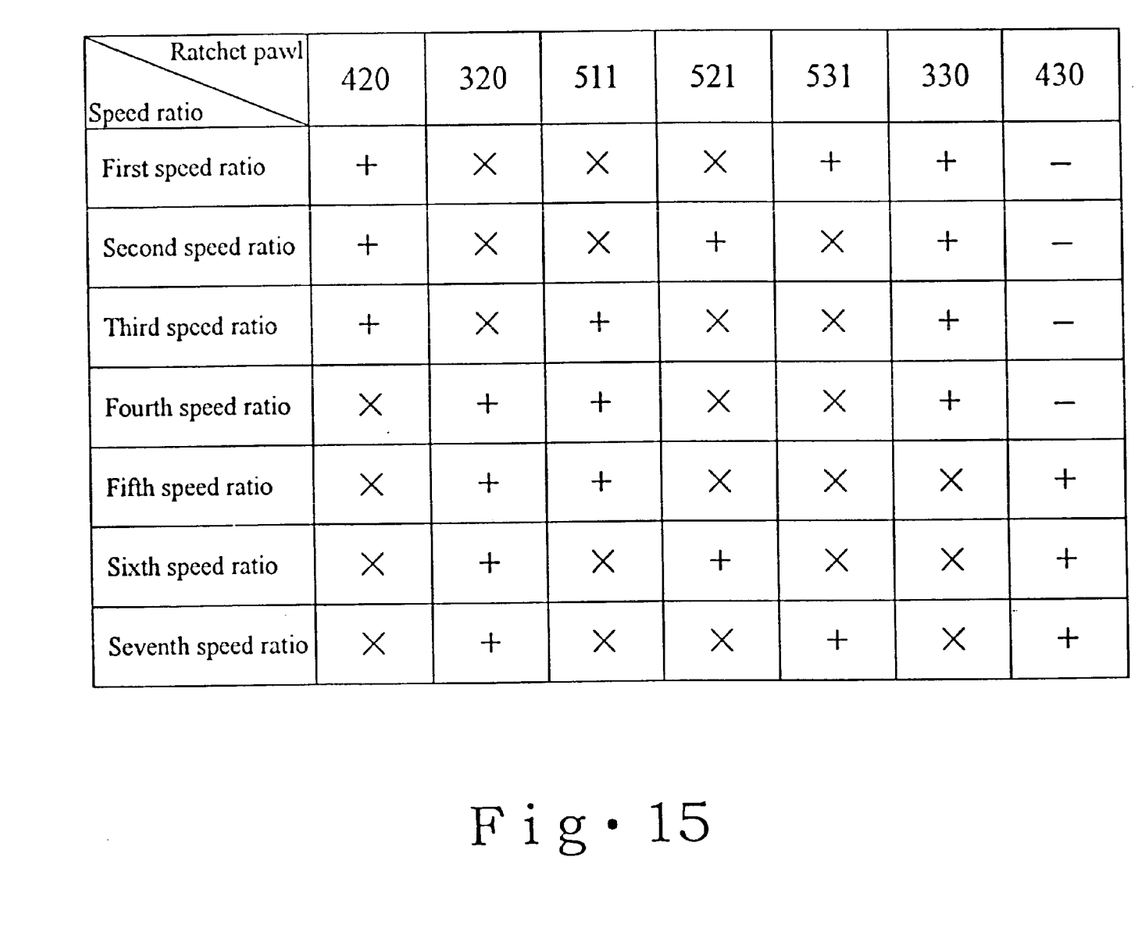
FIG. 15 is a table containing the data of the motions of each ratchet pawl of the present invention at each speed ratio.

As shown in FIGS. 7–14, the present invention is provided with a drive mode having seven speed ratios. On the basis of the driving mode at each speed ratio, the action of each ratchet pawl is compiled, as shown in FIG. 15 in which the symbol "+" denotes a retaining action, "×", a forceful shut-off, "−", a shut-off.

At the first speed ratio, the first sleeve 6 moves to the rightmost side to cause the third ratchet pawl set 531 to engage the engagement portion 81 of the fastening shaft 80, so as to fasten the third sun gear 53. The first ratchet pawl set 511 and the second ratchet pawl set 521 are covered by the left covering surface 621 of the first sleeve 6 to remain in the disengaging state. In the meantime, the second sleeve 7 moves to the leftmost position to cause the first input ratchet pawl 420 to pass through the third set control slot 703 to engage the input engagement portion 321. The second input ratchet pawl 320 is covered by the second covering portion 732 to remain in the disengaging state. The second output ratchet pawl 330 is engaged with the second output engagement portion 331 via the first set control slot 701. In the meantime, the power is transmitted from the drive member 1 to the gear support connection body 401 and the gear support 40. The power is finally transmitted to the wheel hub 2 via the planetary gears 41, the third sun gear 53, the ring gear 3, and the second output ratchet pawl 330.

At the second speed ratio, the first sleeve 6 moves to the middle position such that the sloping surface 601 of the first sleeve 6 acts on the third ratchet pawl set sloping side 532, thereby causing the third ratchet pawl to remain in the disengaging state on the right covering surface 622. In the meantime, the first ratchet pawl set 511 remains in the disengaging state. The second ratchet pawl set 521 and the engagement portion 81 of the fastening shaft 80 are engaged so as to fix the second sun gear 52. In the meantime, the second sleeve 7 is located at the leftmost position so as to cause the first input ratchet pawl 420 to engage the input engagement portion 321. The second input ratchet pawl 320 remains in the disengaging state, whereas the second output ratchet pawl 330 is engaged with the second output engagement portion 331. The power is transmitted from the drive member 1 to the gear support connection body 401 and the gear support 40. The power is put through the ring gear 3 via the planetary gears 41 and the second sun gear 52 before the power is finally transmitted to the wheel hub 2 via the second output ratchet pawl 330.

At the third speed ratio, the first sleeve 6 moves to the leftmost position such that the sloping surface 601 of the first sleeve 6 acts on the second ratchet pawl sloping side 522 so as to cause the second ratchet pawl set 521 to remain in the disengaging state on the right covering surface 622. The third ratchet pawl set 531 also remains in the disengaging state. In the meantime, the first ratchet pawl set 511 is engaged with the engagement portion 80 of the fastening shaft 80 so as to fix the first sun gear 51. The second sleeve 7 is located at the leftmost position to enable the first input ratchet pawl 420 to engage the input engagement portion 321. The second input ratchet pawl 320 remains in the disengaging state. The second output ratchet pawl 330 is engaged with the second output engagement portion 331. The power is transmitted from the drive member 1 to the gear support connection body 401 and the gear support 40, and then to the wheel hub 2 via the planetary gears 41, the first sun gear 51, the ring gear 3, and the second output ratchet pawl 330.

Figure 12:
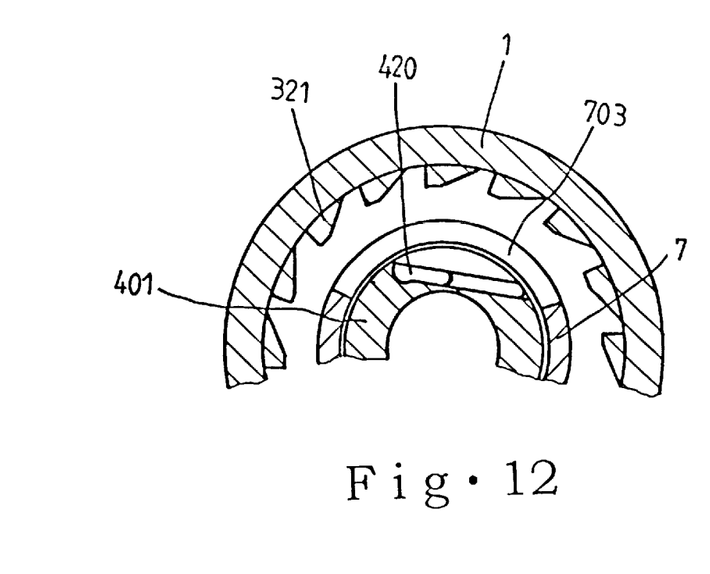
FIG. 12 shows a schematic view of the disengagement of the first input ratchet pawl of the present invention at the fourth, the fifth, the sixth, and the seventh speed ratios.

The fourth speed ratio is a direct drive. The first sleeve 6 still remains as the leftmost position to enable the first ratchet pawl set 511 to engage the engagement portion 81 of the fastening shaft 80, so as to fix the first sun gear 51. The second ratchet pawl set 521 and the third ratchet pawl set 531 are covered by the right covering surface 622 to remain in the disengaging state. When the second sleeve 7 is moved rightward to the middle position, the first input ratchet pawl 420 is covered by the third covering portion 733 in view of the fact that the first input ratchet pawl sloping side 421 is acted on by the third control slot left side inner edge sloping side. The second input ratchet pawl 320 is engaged with the input engagement portion 321 via the second set control slot 702. The second output ratchet pawl 330 is engaged with the second output engagement portion 331. The power is transmitted from the drive member 1 to the ring gear connection body 31 and the ring gear 3. The power is transmitted to the wheel hub 2 via the ring gear 3 and the second output ratchet pawl 330 by bypassing the planetary gears 41 and the first sun gear 51.

At the fifth speed ratio, the first sleeve 6 remains at the leftmost position such that the first ratchet pawl set 511 is engaged with the engagement portion 81 of the fastening shaft 80 so as to fix the first sun gear 51. In the meantime, the second sleeve 7 is moved rightward to locate at the rightmost position such that the first input ratchet pawl 420 is covered by the first covering portion 731 to remain in the disengaging state. The second input ratchet pawl 320 is engaged with the input engagement portion 321 via the second set control slot 702. The second output ratchet pawl 330 is covered by the first covering portion 731 to remain in the disengaging state in view of the action of the left side inner edge of the first control slot 701 and the second output ratchet pawl sloping side 332. The power is transmitted from the drive member 1 to the ring gear connection body 31 and the ring gear 3 and then to the wheel hub 2 via the planetary gears 41, the first sun gear 51, the gear support 40, and the first output ratchet pawl 431.

At the sixth speed ratio, the first sleeve 6 is moved to the middle position. In view of the action of the sloping surface 601 of the first sleeve 6 and the first ratchet pawl set sloping side 512, the first ratchet pawl set remains in the disengaging state on the left covering surface 621. The second ratchet pawl set 521 is engaged with the engagement portion 81 of the fastening shaft 80 so as to fix the second sun gear 52. The third ratchet pawl set 531 is disengaged on the right covering surface 622. In the meantime, the second sleeve 7 is located at the rightmost position such that the first input ratchet pawl 420 is disengaged, and that the second input ratchet pawl 320 is engaged with the input engagement portion 321, and further that the second output ratchet pawl 330 is disengaged. The power is transmitted from the drive member 1 to the ring gear connection body 31 and then to the wheel hub 2 via the the ring gear 3, the planetary gears 41, the second sun gear 52, the gear support 40, and the first output ratchet pawl 431.

At the seventh speed ratio, the first sleeve 6 is moved to locate at the rightmost position. In view of the action of the sloping surface 601 of the first sleeve and the second ratchet pawl set sloping side 522, the second ratchet pawl set 521 is disengaged on the left covering surface 621. In the meantime, the first ratchet pawl set 511 is also disengaged. The ratchet pawl 531 is engaged with the engagement portion 81 of the fastening shaft 80 so as to fix the third sun gear 53. The second sleeve 7 is located at the rightmost position such that the first input ratchet pawl 420 is in the disengaging state, and that the second input ratchet pawl 320 is engaged with the input engagement portion 321, and further that the second output ratchet pawl 330 is in the disengaging state. The power is transmitted from the drive member 1 to the ring gear connection body 31 and the ring gear 3, and then to the wheel hub 2 via the planetary gears 41, the second sun gear 52, the gear support 40, and the,first output ratchet pawl 431.

The transmission mechanism of the present invention makes use of the movement of the first sleeve 6 to enable the ratchet pawl of the sun gear to engage the engagement portion 81 of the fastening shaft 80 so as to fix the sun gear. In addition, in the process of movement of the first sleeve 6, the engaged ratchet pawl is urged by the sloping surface 601 to become disengaged. Furthermore, the present invention makes use of the second sleeve 7 to enable the first input ratchet pawl 420 or the second input ratchet pawl 320 to engage the input engagement portion 321 via the third set control slot 703 or the second set control slot 702. The mechanism of the present invention is not confined to served speeds. The number of speed of the present invention depends on the number of the sun gear and the number of the planetary gear.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A speed-changing control mechanism of a multistage speed-changing wheel hub, comprising:

a fastening shaft fastened with a long rod body of the center of a wheel hub and provided in a midsegment thereof with an engagement portion;

a first sleeve movably fitted over said fastening shaft such that said first sleeve moves linearly along the direction of a longitudinal axis of said fastening shaft, said first sleeve provided with a plurality of control slots arranged circularly, each of said control slots having a pair of sloping and circularly arranged side surfaces;

a second sleeve having a plurality of ring-shaped covering portions of a stepped construction and movably fitted over said fastening shaft, each of said ring-shaped covering portion of said second sleeve provided with a plurality of control slots arranged circularly, said second sleeve being not directly interconnected with said first sleeve;

a plurality of sun gears fitted rotatably over said first sleeve such that said sun gears are corresponding in location to said engagement portion of said fastening shaft, and that said sun gears have one-way rachet pawl sets different in direction, and further that said sun gears are rotatable on said first sleeve;

a single planetary gear device having a gear support, a large front end hole, and a small rear end hole, said large front end hole being fitted over a periphery of said sun gears such that said planetary gear device and said sun gears turn concentrically, said small rear end hole being engaged with a rear end of said fastening shaft, said planetary gear device also comprising a plurality of stepped portions, which are respectively engaged with said sun gears, and a gear support connection body connected a the front end of said gear support;

a ring gear connected with a ring gear connection body at one end and engaged with one of said stepped portions of said planetary gear device at another end such that said ring gear connection body turns along with said sun gears in a concentric manner;

a drive member of a columnar construction and provided therein with an input engagement portion; and wherein said second sleeve moves along the direction of a longitudinal axis of said fastening shaft to allow said input engagement of said drive member to engage with one of said ring-shaped covering portions via said control slots of said second sleeve to provide a smooth power shifting process, and said first sleeve also moves along the direction of said longitudinal axis of said fastening shaft to allow said ratchet pawls of one of said sun gears to engage with said control slots of said first sleeve and cause said one of said sun gears to engage said engagement portion of said fastening shaft so as to control degrees of freedom of said sun gears.

2. The mechanism as defined in claim 1, wherein said first sleeve has a left covering surface and a right covering surface whereby said left covering surface and said right covering surface serve to cover said engagement portion of said fastening shaft so as to keep said ratchet pawl sets of said sun gears in the disengaging state.

3. The mechanism as defined in claim 1, wherein said control slots of said first sleeve are provided in the periphery thereof with a sloping surface capable of urging said ratchet pawl sets of said sun gears such that said ratchet pawl sets are in the disengaging state at such time when said first sleeve is in motion.

4. The mechanism as defined in claim 3, wherein said sloping surface enables said ratchet pawl sets of said sun gear to slide into said control slot so as to engage said engagement portion of said fastening shaft at the time when said first sleeve is in motion.

5. The mechanism as defined in claim 1, wherein said large front end hole is surrounded at a front periphery thereof with a plurality of protrusions which are circularly arranged and engageable with said gear support connection body.

6. The mechanism as defined in claim 2, wherein said gear support is provided at a rear end thereof with a first output ratchet pawl engageable with said first output engagement portion of said wheel hub.

7. The mechanism as defined in claim 1, wherein said gear support connection body is a columnar body having a front end and a rear end smaller in diameter than said first end wherein said front end is provided with a circular slot engageable with said protrusions of said front end of said gear support.

8. The mechanism as defined in claim 6, wherein said gear support connection portion is provided in said rear end thereof with a first input ratchet pawl engageable with said input engagement portion of said drive member.

9. The mechanism as defined in claim 1, wherein said ring gear is provided at a front end thereof with a second output ratchet pawl engageable with said second output engagement portion of said wheel hub, said ring gear further provided at a rear end thereof with a ring gear connection body fastened therewith.

10. The mechanism as defined in claim 9, wherein said ring gear connection body is a columnar body and is connected with the rear end of said ring gear, said ring gear connection body provided with a second input ratchet pawl engageable with said input engagement portion of said drive member.

11. The mechanism as defined in claim 1, wherein said second sleeve is capable of an axial motion to enable said first input ratchet pawl, said second input ratchet pawl, said first output ratchet pawl or said second output ratchet pawl to pass through said control slot to engage said engagement portion corresponding thereto.

12. The mechanism as defined in claim 11, wherein said control slot has a covering portion for covering said first input ratchet pawl, said second input ratchet pawl, said first output ratchet pawl or said second output ratchet pawl at the time when said second sleeve is in motion.

* * * * *